US012587250B2

(12) United States Patent
Syed Muhammad et al.

(10) Patent No.: US 12,587,250 B2
(45) Date of Patent: Mar. 24, 2026

(54) CHANNEL STATE INFORMATION REPORTING FREQUENCY OPTIMIZATION

(71) Applicant: NOKIA SOLUTIONS AND NETWORKS OY, Espoo (FI)

(72) Inventors: Fahad Syed Muhammad, Orsay (FR); Pavan Koteshwar Srinath, Orsay (FR); Afef Feki, Sceaux (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 296 days.

(21) Appl. No.: 18/482,986

(22) Filed: Oct. 9, 2023

(65) Prior Publication Data

US 2024/0146376 A1     May 2, 2024

(30) Foreign Application Priority Data

Oct. 18, 2022     (FI) ..................................... 20225942

(51) Int. Cl.
H04B 7/06          (2006.01)
(52) U.S. Cl.
CPC ......... H04B 7/0626 (2013.01); H04B 7/0639 (2013.01)
(58) Field of Classification Search
CPC ....... H04L 5/001; H04L 5/003; H04L 5/0048; H04L 5/0051; H04W 24/02; H04B 7/04; H04B 7/06; H04B 7/0613; H04B 7/0615; H04B 7/0617; H04B 7/0619; H04B 7/0621; H04B 7/0626; H04B 7/0639
See application file for complete search history.

(56) References Cited

U.S. PATENT DOCUMENTS

2020/0252142 A1     8/2020     Bedekar
2021/0091838 A1     3/2021     Bai et al.
(Continued)

FOREIGN PATENT DOCUMENTS

WO          2021/004629 A1     1/2021
WO          2021/148136 A1     7/2021
WO          2022/133870 A1     6/2022

OTHER PUBLICATIONS

Ericsson, "Evaluation of AI-CSI", Aug. 22-26, 2022, 3GPP TSG-RAN WG1 Meeting #110, R1-2206883, pp. 1-24 (Year: 2022).*
(Continued)

*Primary Examiner* — Paul H. Masur
(74) *Attorney, Agent, or Firm* — SQUIRE PATTON BOGGS (US) LLP

(57)          ABSTRACT

A method comprises receiving from a user equipment supporting Carrier Aggregation, CA, Channel State Information, CSI, reports for a Primary Component Carrier, PCC, for one or more previous time slots and for a current time slot. CSI reports for a Secondary Component Carrier, SCC are received from the user equipment. The CSI reports include a CSI report for a previous time slot. Each CSI report includes a value of a channel state indicator. The method further comprises predicting a value of the channel state indicator for the SCC for the current time slot; the value is predicted based upon one or more values of the channel state indicator reported for the PCC for the one or more previous time slots and for the current time slot, and at least one value of the channel state indicator reported for the SCC for the previous time slot.

14 Claims, 12 Drawing Sheets

(56)                    References Cited

U.S. PATENT DOCUMENTS

| | | | |
|---|---|---|---|
| 2021/0143883 A1 | 5/2021 | Yerramalli et al. | |
| 2021/0258991 A1 | 8/2021 | Bao et al. | |
| 2021/0351885 A1 | 11/2021 | Chavva et al. | |
| 2022/0278728 A1 | 9/2022 | Vankayala et al. | |
| 2023/0055959 A1* | 2/2023 | Koteshwar Srinath | ...................... |
| | | | H04L 5/001 |

OTHER PUBLICATIONS

Sharp, "GRU for Historical CSI Prediction", Oct. 10-Oct. 19, 2022, 3GPP TSG RAN WG1 #110bis-e, R1-2209386, pp. 1-5 (Year: 2022).*

H. Ryden et al., "Predicting strongest cell on secondary carrier using primary carrier data," In: 2018 IEEE Wireless Communications and Networking Conference Workshops (WCNCW), Barcelona, Spain, Apr. 15-18, 2018, pp. 137-142.

First Opinion on Patentability (Office Action) dated Mar. 20, 2023 corresponding to Finnish Patent Application No. 20225942.

Finnish Search Report dated Mar. 20, 2023 corresponding to Finnish Patent Application No. 20225942.

Second Opinion on Patentability (Office Action) dated Sep. 11, 2023 corresponding to Finnish Patent Application No. 20225942.

3GPP TS 23.288 V17.6.0 (Sep. 2022), Technical Specification, 3rd Generation Partnership Project; Technical Specification Group Services and System Aspects; Architecture enhancements for 5G System (5GS) to support network data analytics services (Release 17), Sep. 2022.

3GPP TS 23.501 V17.6.0 (Sep. 2022), Technical Specification, 3rd Generation Partnership Project; Technical Specification Group Services and System Aspects; System architecture for the 5G System (5GS); Stage 2, (Release 17), Sep. 2022.

Extended European Search Report dated Apr. 2, 2024 corresponding to European Patent Application No. 23200817.7.

* cited by examiner

CHANNEL STATE INFORMATION REPORTING FREQUENCY OPTIMIZATION

CROSS REFERENCE TO RELATED APPLICATION

This application claims the benefit of Finnish Patent Application No. 20225942, filed Oct. 18, 2022. The entire content of the above-referenced application is hereby incorporated by reference.

TECHNICAL FIELD

Various example embodiments relate generally to a method and apparatus for Channel State Information reporting frequency optimization.

BACKGROUND

Multiple Component Carriers systems are a key functionality in 4G/5G mobile communication systems where a very high bit rate communication can be achieved by aggregating multiple Component Carriers (CC) at different center frequencies and by transmitting simultaneously both in the downlink (DL) and the uplink (UL) on aggregated Component Carriers (CC). A user equipment (UE) capable of carrier aggregation (CA) has only one Primary Component Carrier (PCC). In addition, this CA capable UE may also have one or several Secondary Component Carriers (SCC(s)) both in the UL and the DL. The process of adding SCCs is known as CA configuration, which is handled at the radio resource control (RRC) layer of the 3GPP protocol stack. Configured SCC(s) can be either in the active or inactive state, and CA activation is normally handled at the medium access control (MAC) layer of the 3GPP- protocol stack.

Reporting of CQI (both periodic and aperiodic) on the activated CCs is source of continuous overheads in the mobile communication systems. But this problem cannot be solved simply by reducing the CQI reporting frequency since this can significantly impact both the number of UE connections to the cell as well as the maximum cell throughput and UE peak throughput.

Also in a multiple CC system, the uplink channel of the PCC could be used for CQI reporting of SCCs as well, therefore the overheads due to CQI reporting may further impact the capacity of the PCC and thereby increase the overheads.

The same overhead problems occur with the reporting of various channel state indicators: beside the Channel Quality Indicator (CQI), the Channel State Information reports send by a user equipment may include values of one or more channel state indicators like, for example, a Precoding Matrix Indicator (PMI) and a Rank Indicator (RI).

SUMMARY

The scope of protection is set out by the independent claims. The embodiments, examples and features, if any, described in this specification that do not fall under the scope of the protection are to be interpreted as examples useful for understanding the various embodiments or examples that fall under the scope of protection.

According to a first aspect a method comprises: receiving from a user equipment supporting Carrier Aggregation, CA, Channel State Information, CSI, reports for a Primary Component Carrier, PCC, for one or more previous time slots and for a current time slot; receiving, from the user equipment, CSI reports for a Secondary Component Carrier, SCC, wherein the CSI reports include at least one CSI report for a previous time slot, wherein each CSI report includes a value of at least one channel state indicator; predicting a value of the channel state indicator for the SCC for the current time slot, wherein the value is predicted on the basis of one or more values of the channel state indicator reported for the PCC for the one or more previous time slots and for the current time slot and at least one value of the channel state indicator reported for the SCC for the previous time slot.

The method may comprise: configuring the UE with a SCC CSI reporting frequency. The CSI reports for the SCC may be received at the configured CSI reporting frequency. The received CSI reports may include a CSI report for a current time slot. The method may comprise: adjusting the SCC CSI reporting frequency on the basis of a comparison of the value of the channel state indicator reported for the SCC for the current time slot and the predicted value of the channel state indicator for the SCC for the current time slot; and configuring the UE with the adjusted SCC CSI reporting frequency.

Adjusting the SCC CSI reporting frequency may comprise: computing a difference between the value of the channel state indicator received for the SCC for the current time slot and the predicted value of the channel state indicator for the SCC for the current time slot; increasing the SCC CSI reporting frequency when the difference in absolute value is above a first threshold; decreasing the SCC CSI reporting frequency or leaving the SCC CSI reporting frequency unamended when the difference in absolute value is below the first threshold.

When the SCC CSI reporting frequency is increased, the current frequency may be increased until the SCC CSI reporting frequency reaches a PCC CSI reporting frequency configured for reporting CSI for the PCC.

Adjusting the SCC CSI reporting frequency may comprise: adjusting an integer ratio between the PCC CSI reporting frequency configured for reporting CSI for the PCC and the SCC CSI reporting frequency; and computing the SCC CSI reporting frequency based on the integer ratio and the PCC CSI reporting frequency. The integer ratio may be adjusted between a minimum value and a maximum value, for example between 1 and 10.

The channel state indicator may be one of a Channel Quality Channel state indicator, a Precoding Matrix Channel state indicator and a Rank Channel state indicator.

Predicting the value of the channel state indicator may be performed using a trained machine learning, ML, based prediction model. The trained ML-based prediction model may be a model trained for a given SCC. The trained ML-based prediction model may be a model trained per frequency band covering one or more SCCs. The trained ML-based prediction model may be a model trained for several SCCs. The trained ML-based prediction model may include at least one recurrent neural network.

According to a second aspect, one or more embodiments relate to an apparatus comprising at least one processor and at least one memory storing instructions that, when executed by the at least one processor, cause the apparatus to perform: receiving from a user equipment supporting Carrier Aggregation, CA, Channel State Information, CSI, reports for a Primary Component Carrier, PCC, for one or more previous time slots and for a current time slot; receiving, from the user equipment, CSI reports for a Secondary Component Carrier, SCC, wherein the CSI reports include at least one CSI report for a previous time slot, wherein each CSI report includes a value of at least one channel state indicator; predicting a value of the channel state indicator for the SCC for the current time slot, wherein the value is predicted on the basis of one or more values of the channel state indicator reported for the PCC for the one or more previous time slots and for the current time slot and at least one value of the channel state indicator reported for the SCC for the previous time slot.

According to a third aspect, one or more embodiments relate to an apparatus comprising means for performing a method comprising: receiving from a user equipment supporting Carrier Aggregation, CA, Channel State Information, CSI, reports for a Primary Component Carrier, PCC, for one or more previous time slots and for a current time slot; receiving, from the user equipment, CSI reports for a Secondary Component Carrier, SCC, wherein the CSI reports include at least one CSI report for a previous time slot, wherein each CSI report includes a value of at least one channel state indicator; predicting a value of the channel state indicator for the SCC for the current time slot, wherein the value is predicted on the basis of one or more values of the channel state indicator reported for the PCC for the one or more previous time slots and for the current time slot and at least one value of the channel state indicator reported for the SCC for the previous time slot.

The apparatus may comprise means for performing one or more or all steps of a method according to the first aspect. The means may include circuitry configured to perform one or more or all steps of a method according to the first aspect. The means may include at least one processor and at least one memory storing instructions that, when executed by the at least one processor, cause the apparatus to perform one or more or all steps of a method according to the first aspect.

One or more embodiments concern a computer program comprising instructions that, when executed by an apparatus, cause the apparatus to perform a method according to the first aspect. The instructions may cause an apparatus as disclosed herein to perform one or more or all steps of a method according to the first aspect.

One or more embodiments concern a non-transitory computer readable medium comprising program instructions stored thereon for performing at least the following steps: receiving from a user equipment supporting Carrier Aggregation, CA, Channel State Information, CSI, reports for a Primary Component Carrier, PCC, for one or more previous time slots and for a current time slot; receiving, from the user equipment, CSI reports for a Secondary Component Carrier, SCC, wherein the CSI reports include at least one CSI report for a previous time slot, wherein each CSI report includes a value of at least one channel state indicator; predicting a value of the channel state indicator for the SCC for the current time slot, wherein the value is predicted on the basis of one or more values of the channel state indicator reported for the PCC for the one or more previous time slots and for the current time slot and at least one value of the channel state indicator reported for the SCC for the previous time slot.

The program instructions may cause an apparatus disclosed herein to perform one or more or all steps of a method according to the first aspect.

BRIEF DESCRIPTION OF THE DRAWINGS

Example embodiments will become more fully understood from the detailed description given herein below and the accompanying drawings, which are given by way of illustration only and thus are not limiting of this disclosure.

Figure 1:
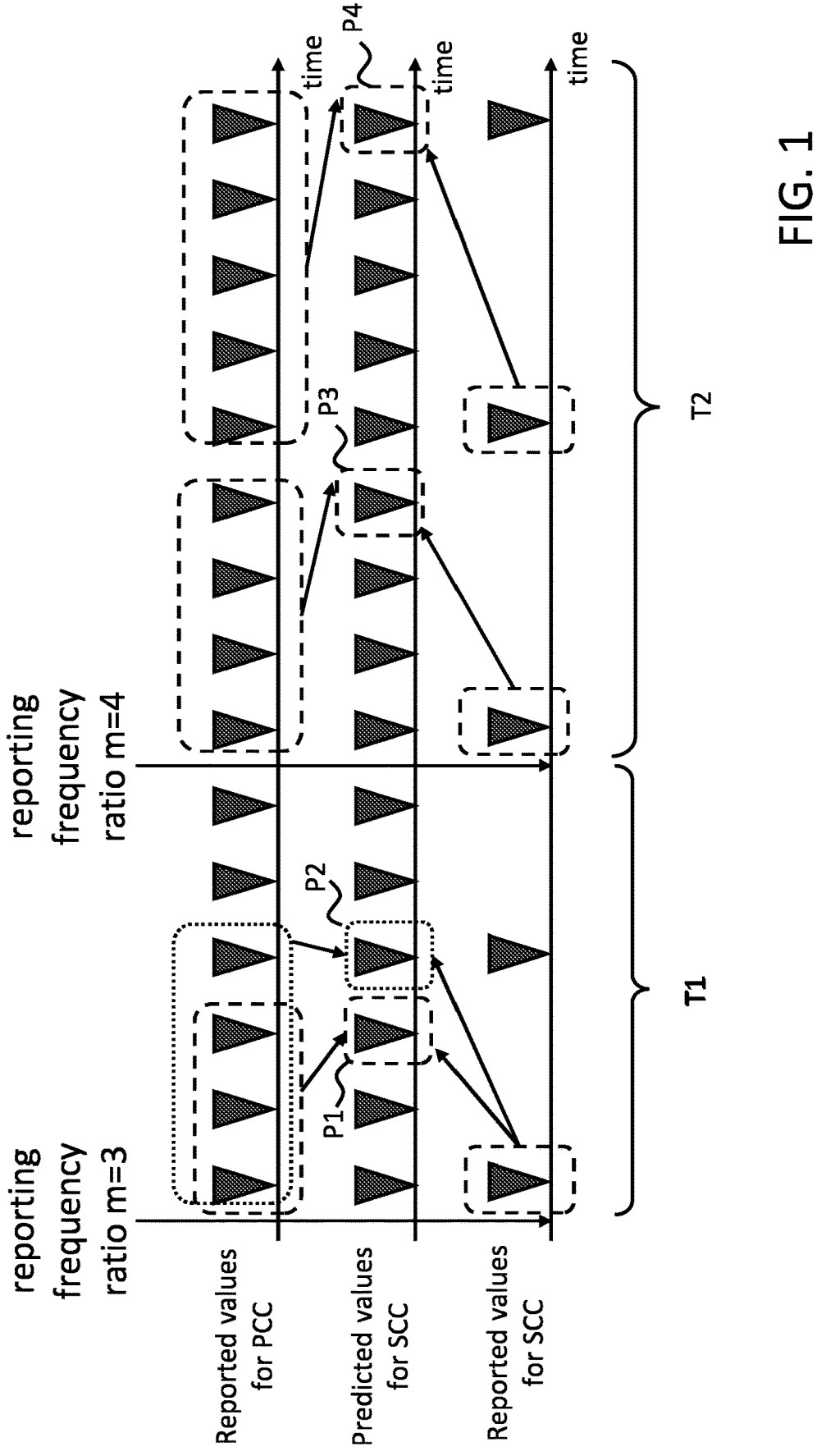
FIG. 1 is a diagram illustrating various aspects of the CSI reporting frequency optimization mechanism according to an example.

It should be noted that these drawings are intended to illustrate various aspects of devices, methods and structures used in example embodiments described herein. The use of similar or identical reference numbers in the various drawings is intended to indicate the presence of a similar or identical element or feature.

DETAILED DESCRIPTION

Detailed example embodiments are disclosed herein. However, specific structural and/or functional details disclosed herein are merely representative for purposes of describing example embodiments and providing a clear understanding of the underlying principles. However these example embodiments may be practiced without these specific details. These example embodiments may be embodied in many alternate forms, with various modifications, and should not be construed as limited to only the embodiments set forth herein. In addition, the figures and descriptions may have been simplified to illustrate elements and/or aspects that are relevant for a clear understanding of the present invention, while eliminating, for purposes of clarity, many other elements that may be well known in the art or not relevant for the understanding of the invention.

One or more example embodiments describe methods for determining a reporting frequency for Channel State Information (CSI). Channel State Information reported by a user equipment may include values of one or more channel state indicator: for example, Channel Quality Indicator (CQI), a Precoding Matrix Indicator (PMI) and a Rank Indicator (RI). CSI report for the SCCs is generally performed for the purpose of carrier activation. For example, the CQI values on the configured SCCs are used to identify the most suitable SCC to activate.

For the purpose of simplicity, the term CQI is used herein to designate both periodic or aperiodic CQI. It should be noted here that although the wording "aperiodic" CQI suggests that the procedure is aperiodic, in real systems its periodicity is set at the base station side but the UE is unaware of its periodicity.

It is proposed to optimize the frequency of the CSI reporting for SCCs based on the reported CSI for the PCC and (partially) on the reported CSI for SCCs in a multi-CC system with carrier aggregation. The CSI is predicted for the SCC and the reported CSIs are used to determine an accuracy of the prediction and to adjust if necessary the reporting frequency of the CSI on the SCC. The reporting frequency of the CSI on the SCC may for example increase when it is detected that the prediction model is not reliable enough, e.g. to track the sudden changes in channel conditions.

The prediction relies at least on the correlation that exists between the channel quality of the PCC and that of the SCC. A correlation between the sequence of previous CSIs on both the PCC and the SCC can for example be determined during a training phase of the ML model. Since CSI reporting of PCC is performed, CSI reported for PCC can be used to predict the CSI for SCCs. But since prediction errors may significantly impact the system performance, complete reliance on SCC CSI prediction might be not secure enough. A method is proposed herein that relies partially on SCC CSI prediction and partially on the CSI reporting for SCCs.

The prediction may be performed using a trained ML model, for example a trained ML sequence model. A mechanism to predict the current CQI on the SCC using the current CQI on the PCC, a sequence of one or more previous CQIs on the PCC (whose reports are received at a predefined frequency), and a sequence of previous CQIs on the SCC (whose reports are received at a tunable reporting frequency).

On this basis an accurate prediction of the CQI can be achieved. As an example, in a typical wireless scenario, there is some degree of correlation between the CQI reports on the PCC and the SCC. There is also a fair degree of correlation between the successive CQI values on the same component carrier, either PCC or SCC. So, by taking all these CQI values into account and training a machine-learning based sequence model, a high degree of accuracy for the predicted CQI can be obtained.

Further, it appears possible to reduce the overall CSI reporting frequency in a multiple component carrier system without diminishing the performance gains brought by carrier aggregation. A balance between reducing the frequency of CSI reports and using CSI prediction is used. A machine-learning (ML)-aided technology is used to dynamically find and fine-tune the reporting frequency of CSIs for SCCs such that the overall system performance is not adversely impacted in case of sudden channel variations.

A mechanism may be used to control and correct the reporting frequency in case of severe channel variations. For example, if the reporting frequency is low and there is a sudden change in the channel quality, this means that the correlation between the current channel quality and the previous channel qualities is lost. Hence, in order to make subsequent predictions, one would have to rely on fresh CQI values which need to be reported more frequently. On the basis of an evaluation of the accuracy of the prediction, it can be determined whether a correction in the reporting frequency is necessary or not.

By using an optimal reporting frequency, gains in maximum cell throughput can be achieved. A good balance between CSI accuracy and signaling overhead reduction can be achieved.

A same approach may be applied for determining the CQI, or the full channel state information (CSI) report (including the prediction of the rank indicator (RI) and pre-coding matrix indicator (PMI)) and not just the CQI) or any of these channel state indicators. To simplify, and without loss of generality, the example embodiments of the CQI reporting is described in detail but the description is applicable to any channel state indicator or any set of channel state indicators for which a reporting frequency is configured by a base station.

The frequency at which the CSI reports are received for the PCC is referred to herein as the PCC CSI reporting frequency or PCC reporting frequency. Likewise, the frequency at which the CSI reports are received for the SCC is referred to herein as the SCC CSI reporting frequency or SCC reporting frequency.

FIG. 1 is a diagram illustrating various aspects of the CSI reporting frequency optimization mechanism for SCC(s).

In a first period of time T1, several CSI reports are available for the PCC. The CSI reports for the PCC are received at a given PCC reporting frequency: in the example 6 CSI reports are received during T1, with one report per time slot. During the same period of time T1,only 2 CSI reports are received for the SCC: in the example the ratio m between the PCC reporting frequency and the SCC reporting frequency is 3.

For each time slot during T1, including the time slots for which no CSI reports are received for the SCC, a ML model is used to generate predicted values for the channel state indicators of the missing CSI reports.

For each prediction, a sliding prediction window is used and all the CQI values reported for the PCC and for the SCC that falls within this sliding prediction window are used. The size of the prediction window may be adjusted such that at least one CQI value reported for the SCC for a previous time slot falls in the prediction window.

As illustrated by the example of FIG. 1, during T1, a CQI value is predicted for the SCC for a current time slot on the basis of at least 3 CQI values (length of CQI value sequence=3 or 4) reported for the PCC for previous time slots and the current time slot and at least one CQI value reported for the SCC for a previous time slot.

For example, for the predicted CQI value P1 predicted for the SCC, 2 CQI values reported for the PCC for previous time slots and 1 CQI value reported for the PCC for the current time slot are used.

For example, for the predicted CQI value P2 predicted for the SCC, 3 CQI values reported for the PCC for previous time slots and 1 CQI value reported for the PCC for the current time slot are used.

At the end of the first period of time T1, the SCC reporting frequency may be adjusted for a next period of time T2 based on the quality of the predictions performed for the SCC. In this example, the ratio m between the PCC reporting frequency and the SCC reporting frequency is set to 4. This example may correspond to a situation in which the quality of the prediction is very good such that the SCC reporting frequency may be decreased.

As illustrated by FIG. 1, during T2, a CQI value is predicted for the SCC for a current time slot on the basis of at least 4 CQI values (length of CQI value sequence=4 or 5) reported for the PCC for previous time slots and the current time slot and at least one CQI value reported for the SCC for a previous time slot.

For example, for the predicted CQI value P3 predicted for the SCC, 3 CQI values reported for the PCC for previous time slots and 1 CQI value reported for the PCC for the current time slot are used.

For example, for the predicted CQI value P4 predicted for the SCC, 4 CQI values reported for the PCC for previous time slots and 1 CQI value reported for the PCC for the current time slot are used.

FIG. 1 illustrate the fact that if the SCC reporting frequency varies (increases or decreases), the size of the sliding prediction window (corresponding to the length of the sequence of CQI values) for performing the prediction has to be adjusted in order to have at least one reported CQI value for the SCC that falls in the sliding prediction window. This means that the prediction model has to be able to take into account different sizes of the sliding prediction window. In practice, a prediction model may be generated for a plurality of predefined sizes of the sliding prediction window, i.e. for a plurality of predefined lengths of the sequence of CQI values.

In one or more embodiments, the size of the sliding prediction window corresponds to the ratio m between the PCC reporting frequency and the SCC reporting frequency such that one CQI value reported for the SCC always falls in the sliding prediction window. The ratio m is also the ratio between the SCC reporting period and the PCC reporting period.

Figure 2:
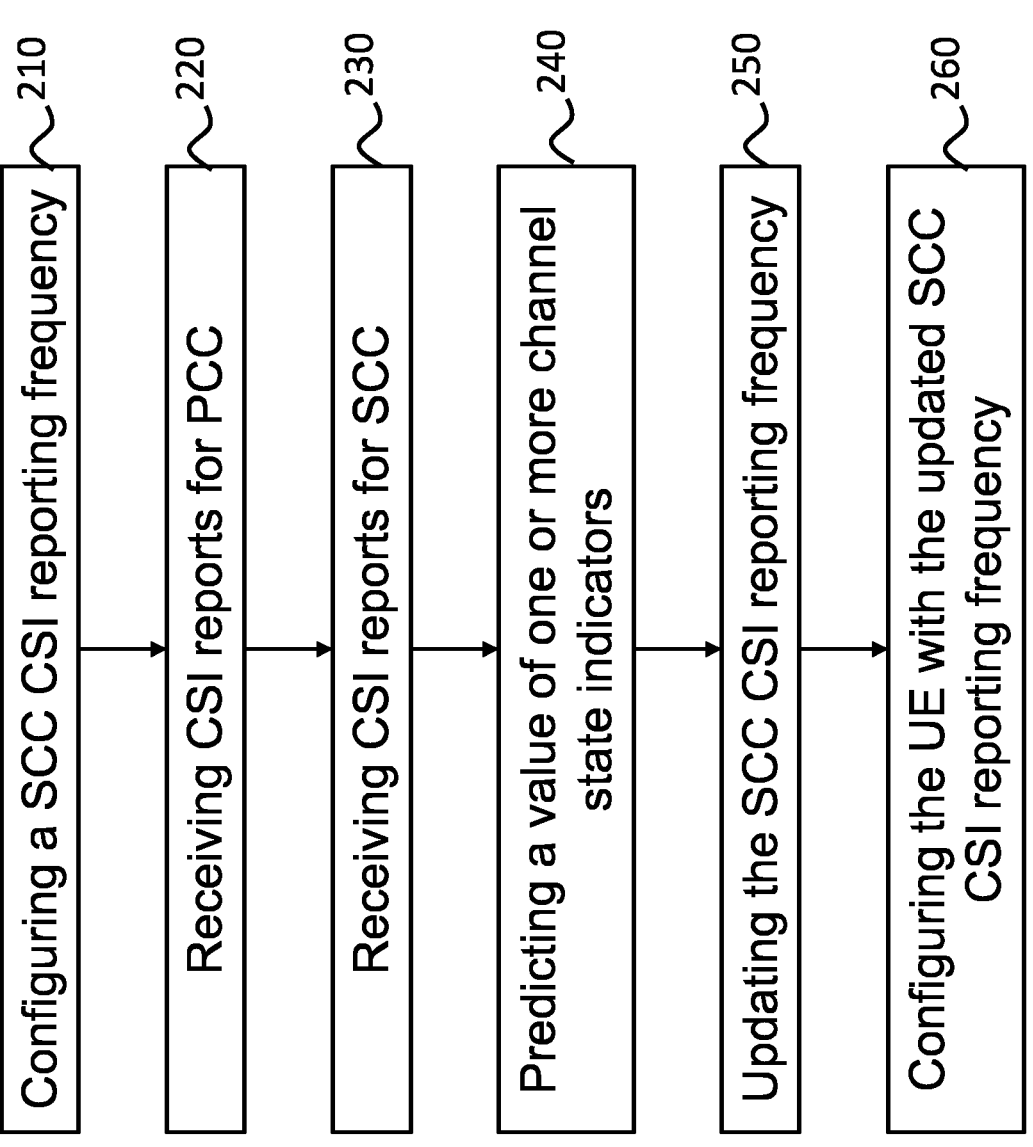
FIG. 2 is a flowchart of a method for optimizing a SCC CSI reporting frequency according to an example.

FIG. 2 is a flowchart of a method for optimizing a SCC CSI reporting frequency according to one or more example embodiments. The steps of the method may be executed by an access node (e.g. a base station) for one or more user equipment(s) supporting carrier aggregation (CA).

The method may be implemented for radio telecommunication systems, including a fifth generation (5G) network or 6G network. Prior or subsequent generations of radio telecommunication systems may be concerned by the adjustment of the SCC CSI reporting frequency as disclosed herein.

An access node may be any type of base station (eNB, gNB, gNB-DU, gNB-CU, etc). At least part of the functionalities of the access node may also be carried out by a network entity (like a network node, a server, a host device, a host system) which is operably coupled to a transceiver (such as a remote radio head for example) and which may include other functions (such as an OAM function or another network function that may be used for implementing features in a NWDAF, Network Data Analytics Function, etc).

A user equipment, UE, (or user terminal, user device) may refer to a computing device that includes wireless mobile communication devices operating with or without a subscriber identification module (SIM), including, but not limited to, the following types of devices: a mobile station (MS), a mobile phone, a radio cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples.

While the steps are described in a sequential manner, the person skilled in the art will appreciate that some steps may be omitted, combined, performed in different order and/or in parallel.

In step 10, a SCC CSI reporting frequency is configured for the UE.

In step 220, one or more CSI reports are received for a PCC from the UE.

In step 230, one or more CSI reports are received for one or more SCCs from the UE. The received CSI reports include a CSI report for a current time slot for one or more SCCs and one or more CSI reports for one or more SCCs for previous time slots. For each of one or more channel state indicators used in CSI reports, the CSI report includes a value of the channel state indicator. A channel state indicator may be any indicator present in a CSI report. For example Channel Quality Indicator, a Precoding Matrix indicator, a Rank indicator, etc.

In step 240, for each of one or more channel state indicators, a value of the channel state indicator for the SCC for the current time slot is predicted. The value is predicted on the basis of one or more values of the channel state indicator reported for the PCC and at least one value of the channel state indicator reported for the SCC for a previous time slot. For example, a CQI value is predicted on the basis of one or more CQI values reported for the PCC for previous time slots and the current time slot and at least one CQI value reported for the SCC for a previous time slot.

The prediction may be performed by a prediction model in various manners. A ML (machine learning) model may be used and trained specifically for a given SCC. The prediction model may be trained per frequency band covering one or more SCCs. The prediction model may be trained for several SCCs. The prediction model may include at least one recurrent neural network.

In step 250, the SCC CSI reporting frequency is adjusted on the basis of a comparison of the value of the channel state indicator in the CSI report for the SCC for the current time slot and the predicted value of the channel state indicator for the SCC for the current time slot.

In step 260, the updated SCC CSI reporting frequency is configured for the UE.

When CSI reporting is periodic the periodicity is configured by a base station in an RRC configuration message sent to the UE. When CSI reporting is aperiodic, every time the base station needs to have a CSI report, the base station grants the UE to send an aperiodic CSI report. Configuring a UE with a SCC CSI reporting frequency may therefore include one of: sending an RRC message to the UE with the SCC CSI reporting frequency and sending a UL grant message (e.g. the UE receives an UL grant on PDCCH with DCI Format 0_1) message to the UE to cause the UE to send a CSI report.

The adjusting of the SCC CSI reporting frequency (step 250) may be performed in various manners.

In one or more embodiments, a difference between the value of the channel state indicator in the CSI report for the SCC for the current time slot and the predicted value of the channel state indicator for the SCC for the current time slot is computed. The SCC CSI reporting frequency may be increased when the difference in absolute value is above a first threshold. The SCC CSI reporting frequency may be decreased or left unchanged when the difference in absolute value is below the first threshold.

In one or more embodiments, when the SCC CSI reporting frequency is increased based on the difference, the current frequency may be increased until the SCC CSI reporting frequency is equal to a PCC CSI reporting frequency configured for the PCC.

In one or more embodiments, an integer ratio between the PCC CSI reporting frequency and the SCC CSI reporting frequency is configured. The integer ratio may be adjusted in a stepwise fashion based on the difference. The SCC CSI reporting frequency may then be computed based on the adjusted integer ratio and the PCC CSI reporting frequency.

Figure 3:
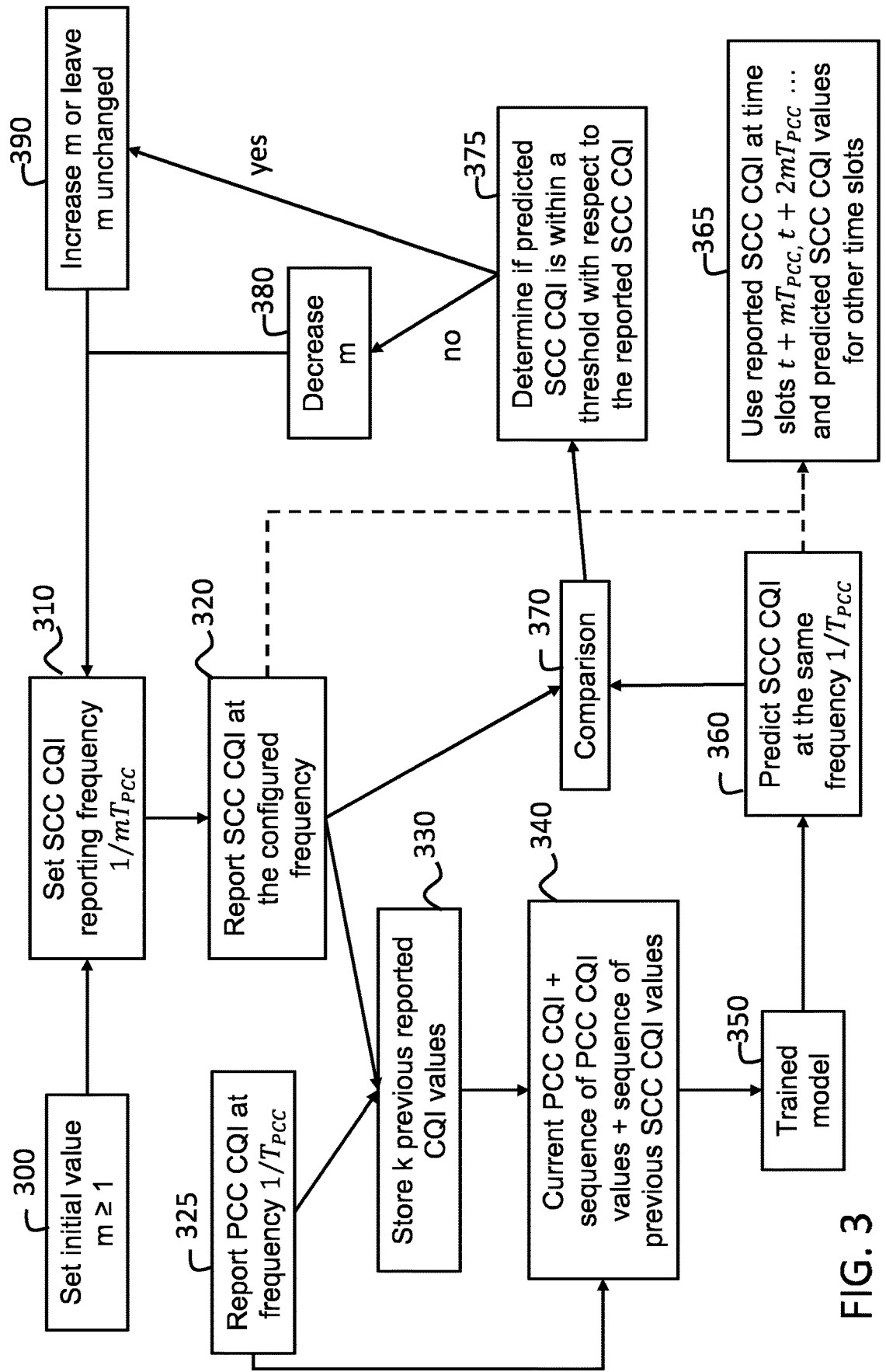
FIG. 3 is a flowchart of a method for optimizing a SCC CSI reporting frequency according to an example.

FIG. 3 shows a detailed flowchart of an example method for CQI reporting frequency optimization for the SCC.

The CQI reporting on the PCC is performed every $T_{PCC}$ seconds. The SCC CQI reporting frequency is adjusted such that the CQI on the SCC is reported at a frequency much lower than on the PCC (which is $1/T_{PCC}$ per second) if the channel variation is minimal, and at a frequency closer to $1/T_{PCC}$ if the channel variation is extreme. The SCC-CQI reporting frequency is configured (step 310, L2 operation) at $1/mT_{PCC}$ per second, where m is an integer ratio such that m=1, 2, 3, . . . . Initially (step 300), m may be set at some fixed value and is varied depending on the channel variations. Denote the CQI value on the PCC and the SCC made at time instant t by $PCQI_t$ and $SCQI_t$, respectively. Thus, if the PCC CQI reports are made (step 325) at time instants $t, t+T_{PCC}, t+2T_{PCC}, \ldots$, the SCC CQI reports are made (step 320) at time instants $t, t+mT_{PCC}, t+2mT_{PCC}, \ldots$.

The goal is to accurately predict the SCC CQI at all the time instants the PCC CQI report is received, but independently. The prediction is done when SCC CQI is not reported as well as when SCC CQI is reported to allow fine tuning of the SCC CQI reporting frequency based on a comparison of the reported SCC CQI value with a predicted SCC CQI value for the same time slot. For this purpose, previous k values of the PCC CQI and the received SCC CQI values in these time intervals (corresponding to previous time slots $t_{n-k+1}$) are stored (Step 330). The value of k is required to be larger than m to ensure that at least one SCC CQI value is available for a previous time slot.

Let us denote the null character by '\0'. Then, the inputs to be used by the prediction model for the prediction of the SCC CQI at time slot $t_n$ are obtained (step 340) The inputs may include $\{PCQI_{t_{n-k}}, PCQI_{t_{n-k+1}}, \ldots, PCQI_{t_n}\}$ and $\{X_{t_{n-k}}, X_{t_{n-k+1}}, \ldots, X_{t_n}\}$, where $\forall i=0,1,\ldots,k-1:\{PCQI_{t_{p-k}}; X_{t_{n-k}}\}$ $PCQI_{t_{n-k+i}}$ is the reported PCC CQI value at time slot $t_{n-k+i}$;

$SCQI_{t_{n-k+i}}$ is the reported SCC CQI value at time slot $t_{n-k+i}$;

$$X_{t_{n-k+i}} = \begin{cases} SCQI_{t_{n-k+i}} & \text{if a } SCC\ CQI \text{ value is received at time slot } t_{n-k+i} \\ \text{'\0'} & \text{otherwise} \end{cases}$$

An offline-trained multi-input, single-output prediction model (e.g. LSTM or RNN sequence model) is used to predict the value of $SCQI_{t_n}$ (step 350). The predicted value of $SCQI_{t_n}$ is noted $\widehat{SCQI}_{t_n}$ and is obtained at step 360.

The reported SCC CQI values at time slots $t+mT_{PCC}, t°2, T_{PCC}, \ldots$ are used (step 365) by the base station for configuration of the communication channel with the concerned UE. For the other time slots, for which no CQI report is available, the predicted SCC CQI values are used in replacement of the missing reported SCC CQI values (step 365).

The SCC CQI reporting frequency is adjusted (steps 370-375-380). Whenever there is a sudden variation in the channel conditions, the sequence model cannot make accurate predictions because of the loss of time correlation between successive CQI values. Such a situation can be identified by comparing the received SCC CQI value with the predicted value (step 370).

For example, if a SCC CQI value of $SCQI_{t_n}$ is received at time slot $t_n$ and the predicted value is $\widehat{SCQI}_{t_n}$. A threshold value $\delta$ is used to define a tolerance level.

If $|SCQI_{t_n}-\widehat{SCQI}_{t_n}| \geq \delta$ (step 375), it is an indication that there has been a sudden change in channel condition which the prediction model has been unable to capture. In such a case, the value of the integer ratio m is reduced (step 380) to be closer to 1 so that SCC CQI is reported at a frequency closer to that of the PCC. The integer ratio m may be reduced in a stepwise fashion.

If $|SCQI_t-\widehat{SCQI}_t| < \delta$, the value of m is either left unchanged or can even be increased (step 390). For example, if the predicted CQI values are very accurate, it indicates a lack of variation in the channel conditions and so, the reporting frequency can be lowered. The integer ratio m may be increased in a stepwise fashion.

After step 390, steps 310-390 may be executed again in a further processing loop.

The prediction model may be a recurrent ML-based model or ML-based sequence model, for example a recurrent neural network (RNN) (e.g. a Long Short Term Memory, LSTM; Gated recurrent unit (GRU); etc). In these recurrent ML-based models, an internal state of the ML-based model at a given time slot is stored by the ML-based model and re-used for a next prediction at a next time slot.

This type of recurrent model/sequence model captures the time dependencies between successive CQI values very well. The loss function to use when training the model may be the mean absolute error (MAE) loss which used the difference between the reported value and the predicted value: $|SCQI_{t_n}-\widehat{SCQI}_{t_n}|$.

Figure 4:
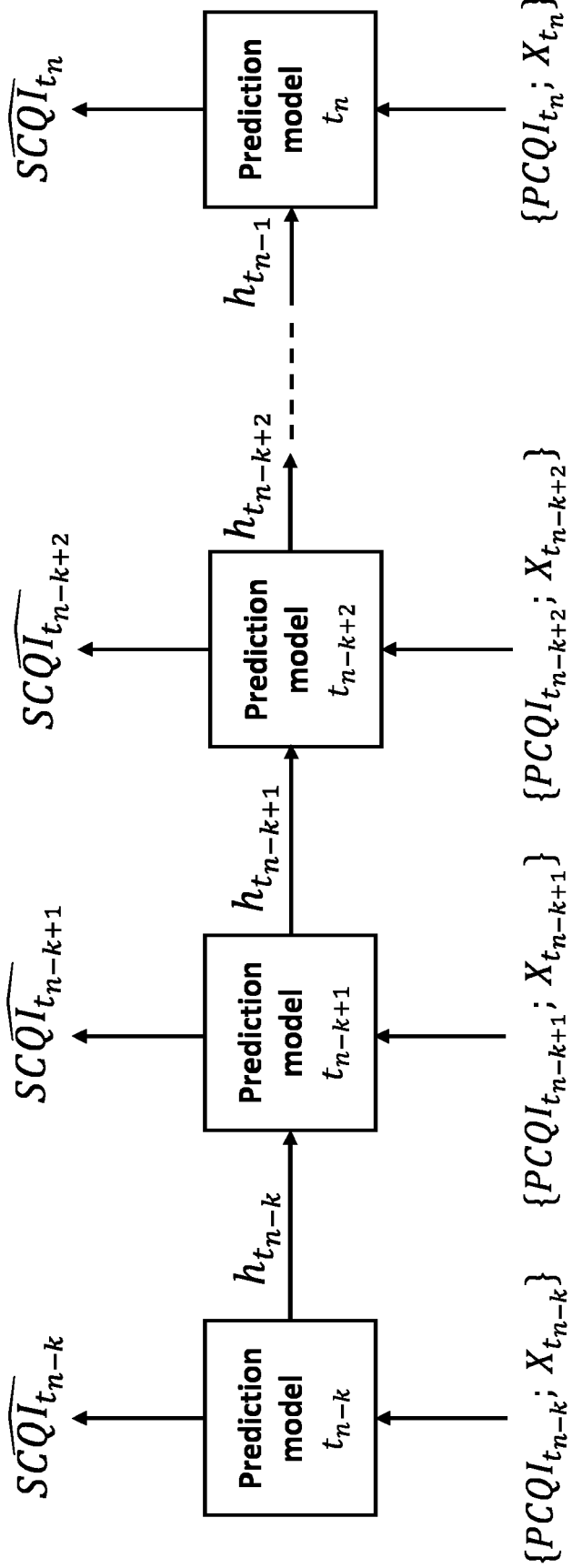
FIG. 4 is a diagram showing a prediction model according to an example.

An example of such an LSTM network is illustrated by FIG. 4.

In FIG. 4, a plurality of cells is represented, where each cell corresponds to a state of the ML-based model at a given time slot. In the figure, $h_{t-k+i}$ denotes the hidden cell state for the LSTM at time slot $t-k-i$ that is generated by the cell at time slot $t-k+i$ and used by the cell at the next time slot $t-k+i+1$.

Such a model can be trained for example in the following manner. The value of sequence length k is chosen and may be fixed. Next, a training dataset is formed from sequences of $k+1$ consecutive reported PCC CQI values and the corresponding sequence of k consecutive reported SCC CQI values, where the last $k+1^{th}$ reported SCC CQI value forms the target output label for the supervised training.

All values of $m < k$ may be considered (where the value of m determines the percentage of reduction in SCC CQI reporting frequency with respect to the PCC CQI reporting frequency). For a chosen value of m, reported SCC CQI values in each sequence are replaced by a specific input value (e.g. '\0') in the positions selected randomly in the sequence, the specific value being representative of the absence of a reported SCC CQI value at the time slot corresponding to the position in the sequence.

For example, if $k=4$ and $m=2$, then sequences of 5 consecutive PCC CQI values along with the corresponding sequence of 4 consecutive SCC CQI values are considered with the $5^{th}$ SCC CQI value forming the target output label. Arbitrarily, the SCC CQI values in either positions 1 and 3, or in positions 2 and 4 are replaced by the specific input value (e.g.'\0'). These sequences form the training labelled data. The generation of the training sequences may be repeated for several values of m under consideration. The CQI values may be one hot encoded in an input vector of the model, with the all-zero vector representing the specific input value (e.g.'\0'). The prediction is performed and compared with a corresponding target output label to adjust the coefficients of the model during the training.

The training of the prediction model may be performed for a given SCC, per frequency band covering one or more SCCs or for several SCCs. A prediction model may be used per channel state indicator or a prediction model may be configured to perform predictions for several channel state indicators (e.g. CQI, RMI, RI).

By using a sequence model like LSTM to predict the CQI values, the accuracy of prediction is high. This is because such a ML-model captures both the dependencies between the channel qualities of the PCC and SCC, and also the time correlation between the successive CQI samples.

The ability to accurately predict CQI values diminishes the need for frequent reporting of the CQI values. However, in case of significant and drastic channel variations, the provision made to correct the reporting frequencies ensures that the overall system performance is left unhindered.

Furthermore, a reduction in unnecessary CQI reports leads to an overall increase in the cell throughput.

Figure 5:
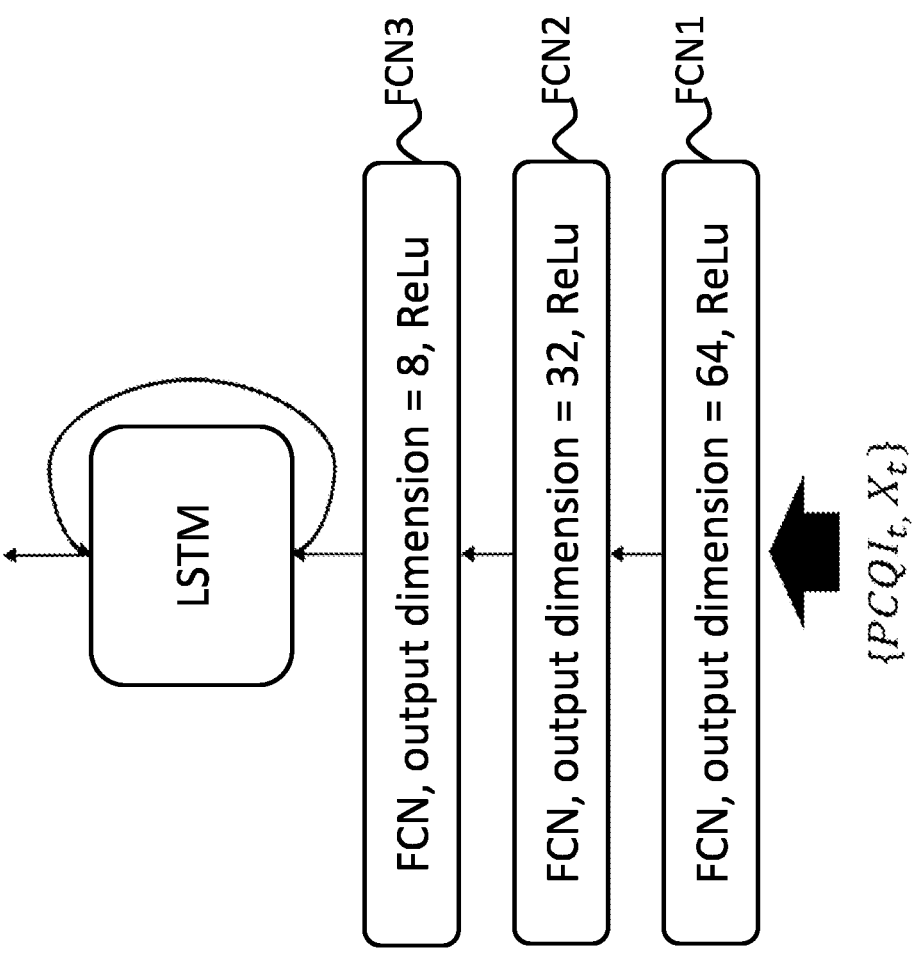
FIG. 5 shows an example architecture of a prediction model according to an example.

FIG. 5 shows an example architecture of a prediction model. The prediction model includes here 3 successive layers of fully connected networks (FCN) and a LSTM. The FCNs have respective output dimensions (i.e. the number of output nodes) that decrease from 64 to 32 then to 8 for the last FCN connected to the LSTM. The activation function at the output of each FCN may be the rectifier linear unit (ReLu) function. The loop represented in this figure for the LSTM indicates that a hidden state of the LSTM at a given time slot is stored and used as input for a next time slot.

Figure 6:
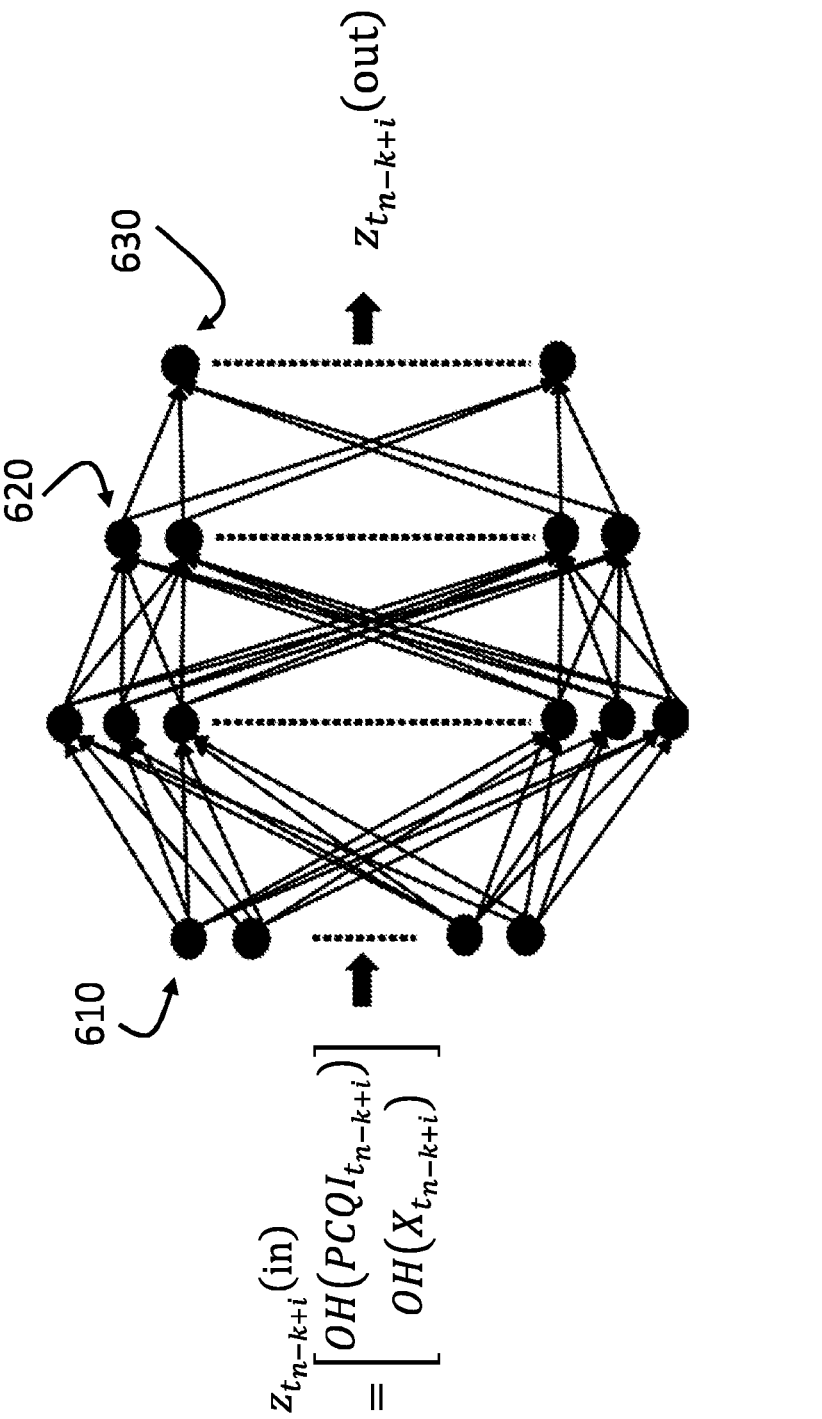
FIG. 6 is a diagram showing aspects and components of a prediction model according to an example.

FIG. 6 shows an FCN architecture that can be used at each time slot $t_{n-k+i}$. The FCN has for example 32 input nodes and 32 hidden nodes and 8 output nodes. The input vector is noted $z_{t_{n-k+i}}(\text{in})$ and the output vector $z_{t_{n-k+i}}(\text{out})$. The input vector is defined as $$z_{t_{n-k+i}}(\text{in}) = \begin{bmatrix} OH\left(PCQI_{t_{n-k+i}}\right) \\ OH\left(X_{t_{n-k+i}}\right) \end{bmatrix}$$

where:
 OH $(PCQI_{t_{n-k+i}})$ is a 16-dimensional vector that is one hot encoded, with all vector components values set to zero except for the vector component whose position is equal to the reported CQI value. For example, if the reported PCC CQI value is equal to 12, all vector components are set to 0 except the component at the $12^{th}$ position that is set to 1;
 OH $(X_{t_{n-k+i}})$ is a 16-dimensional vector that is one hot encoded, for which: all vector components values are set to zero if the SCC CQI value is not reported for this time slot; and all vector components set to zero except for the component whose position is equal to the reported SCC CQI reported value if a SCC CQI value is reported for this time slot.

The activation function in each hidden node may be the rectifier linear unit (ReLU) activation given by f(x)=max(0, x).

If the input to a hidden node i is a vector z, the output is $f(w_i^T z + b_i)$ where f is the ReLU activation function, $w_i$ is the trainable weight vector for node i, and $b_i$ is the trainable bias associated with node i. The output nodes also use the ReLU activation function.

The purpose of the FCN is to process the input $Z_{t_{n-k+i}}(\text{in})$ into a learned representation $Z_{t_{n-k+i}}(\text{out})$ that is used as the input to the LSTM. A FCN also allows to reduce the dimension of the input vectors of the LSTM.

Figure 7:
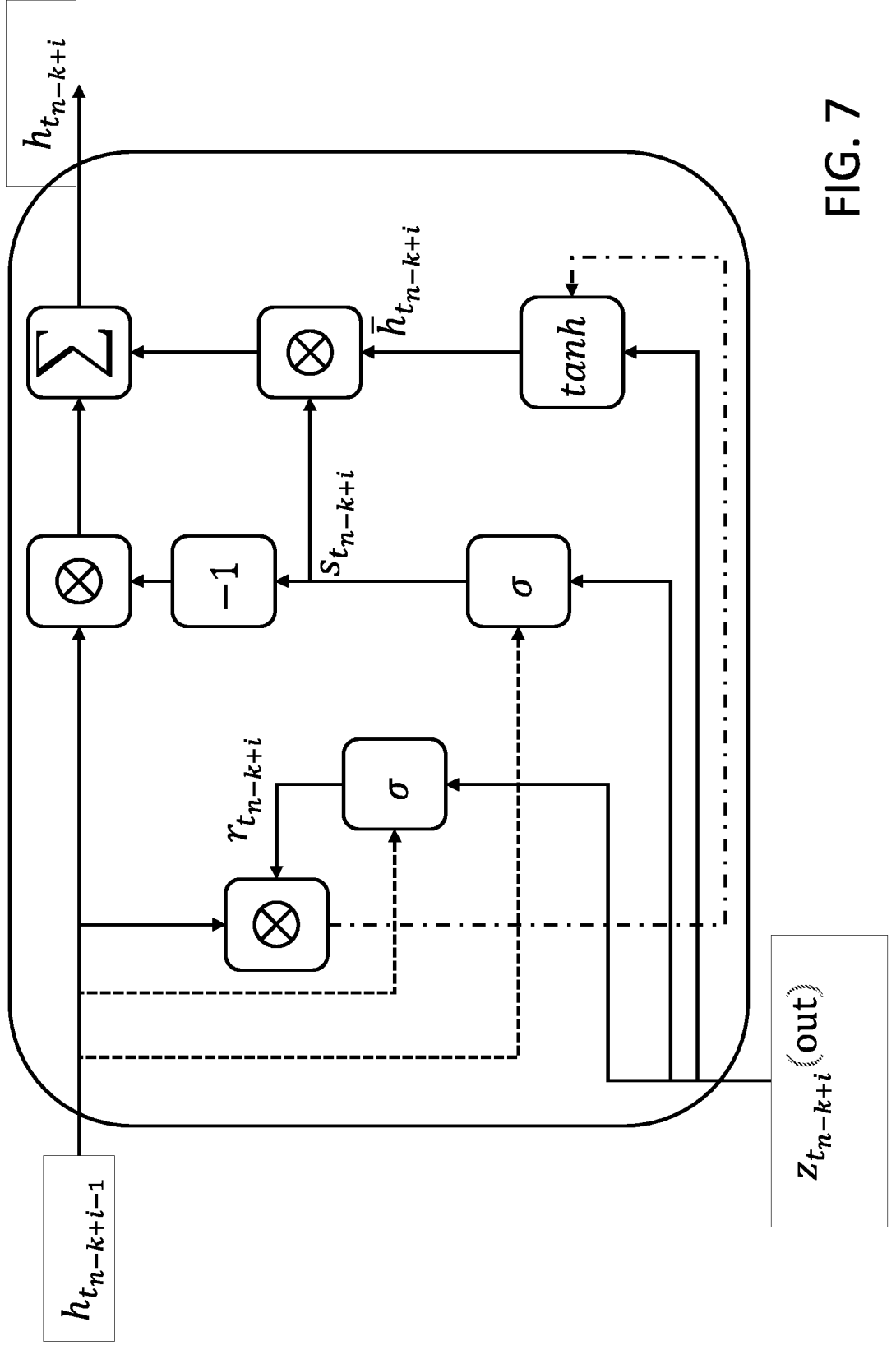
FIG. 7 is a diagram showing aspects and components of a prediction model according to an example.

FIG. 7 shows an example LSTM that can be used for CQI values prediction.

At each time slot $t_{n-k+i}$, the LSTM receives as input the output $Z_{t_{n-k+i}}(\text{out})$ of the last FCN. The hidden state $h_{t_{n-k+i}}$ of the LSTM stores information about the PCC and SCC (if available) CQI values at time slot $t_{n-k+i-1}$ and is used as input for the LSTM for the next time slot. The hidden state represents the part of the input $Z_{t_{n-k+i}}(\text{out})$ that is relevant for the final output prediction.

The following state vectors may be used by the LSTM:

$$s_{t_{n-k+i}} = \sigma\left(w_s^T \begin{bmatrix} h_{t_{n-k+i-1}} \\ Z_{t_{n-k+i}}(\text{out}) \end{bmatrix}\right)$$

-continued $$r_{t_{n-k+i}} = \sigma\left(w_r^T \begin{bmatrix} h_{t_{n-k+i-1}} \\ Z_{t_{n-k+i}}(\text{out}) \end{bmatrix}\right)$$

$$\tilde{h}_{t_{n-k+i}} = \tanh\left(w_u^T \begin{bmatrix} r_{t_{n-k+i}} * h_{t_{n-k+i-1}} \\ Z_{t_{n-k+i}}(\text{out}) \end{bmatrix}\right)$$

$$h_{t_{n-k+i}} = \left(1 - s_{t_{n-k+i}}\right) * h_{t_{n-k+i=1}} + s_{t_{n-k+i}} * \tilde{h}_{t_{n-k+i}}$$

where * indicates element-wise multiplication, and $w_s, w_r$, and $w_u$ are trainable weight vectors. The function $\sigma$ that is used to compute the values of the scalars $s_{t_{n-k+i}}$ and $r_{t_{n-k+i}}$ may be a linear function, i.e., $\sigma(x)=x$, but other functions may be used.

Figure 8A:
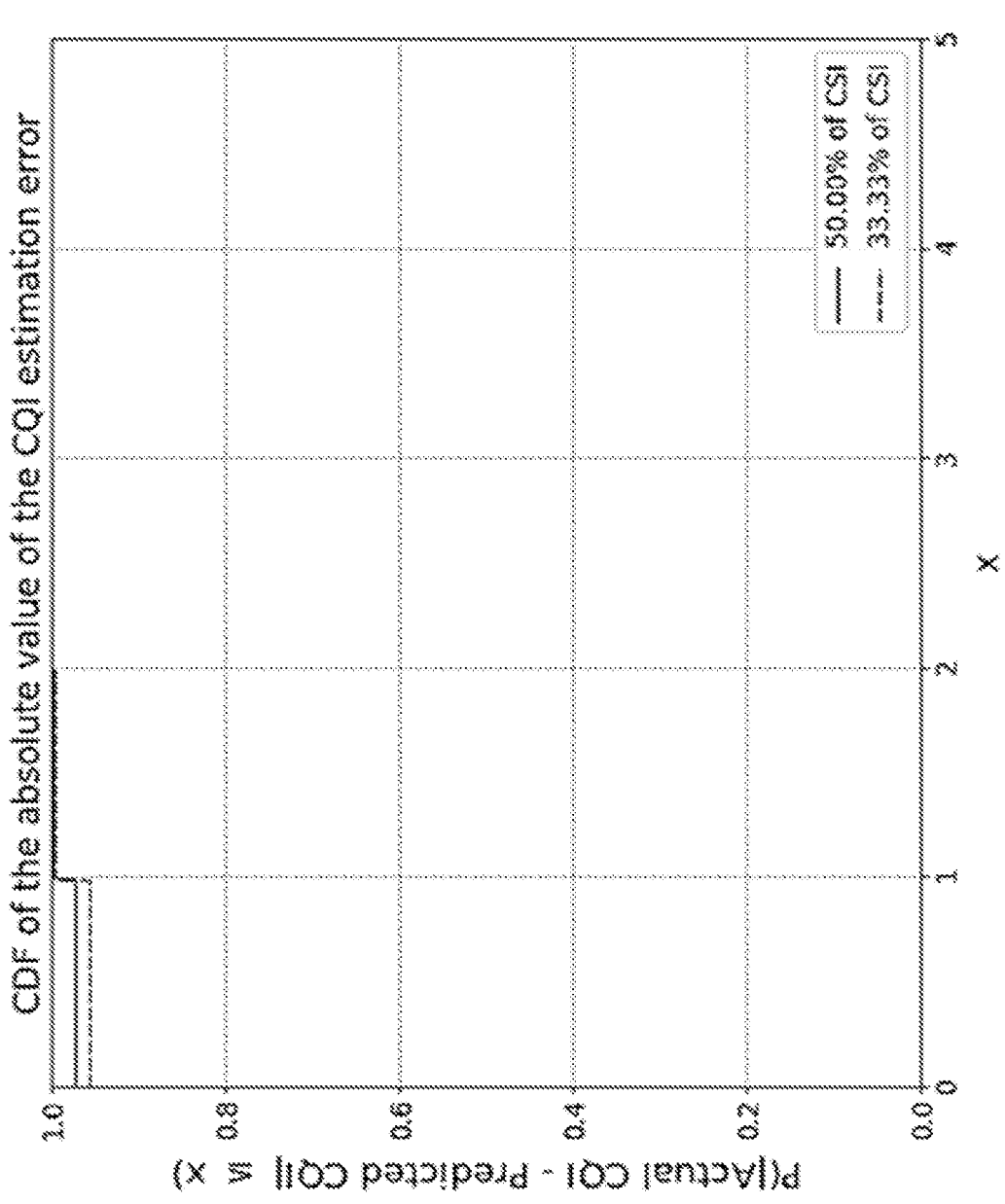
FIGS. 8A to 8C shows performance of predictions performed for SCC CQI values according to an example.
Figure 8B:
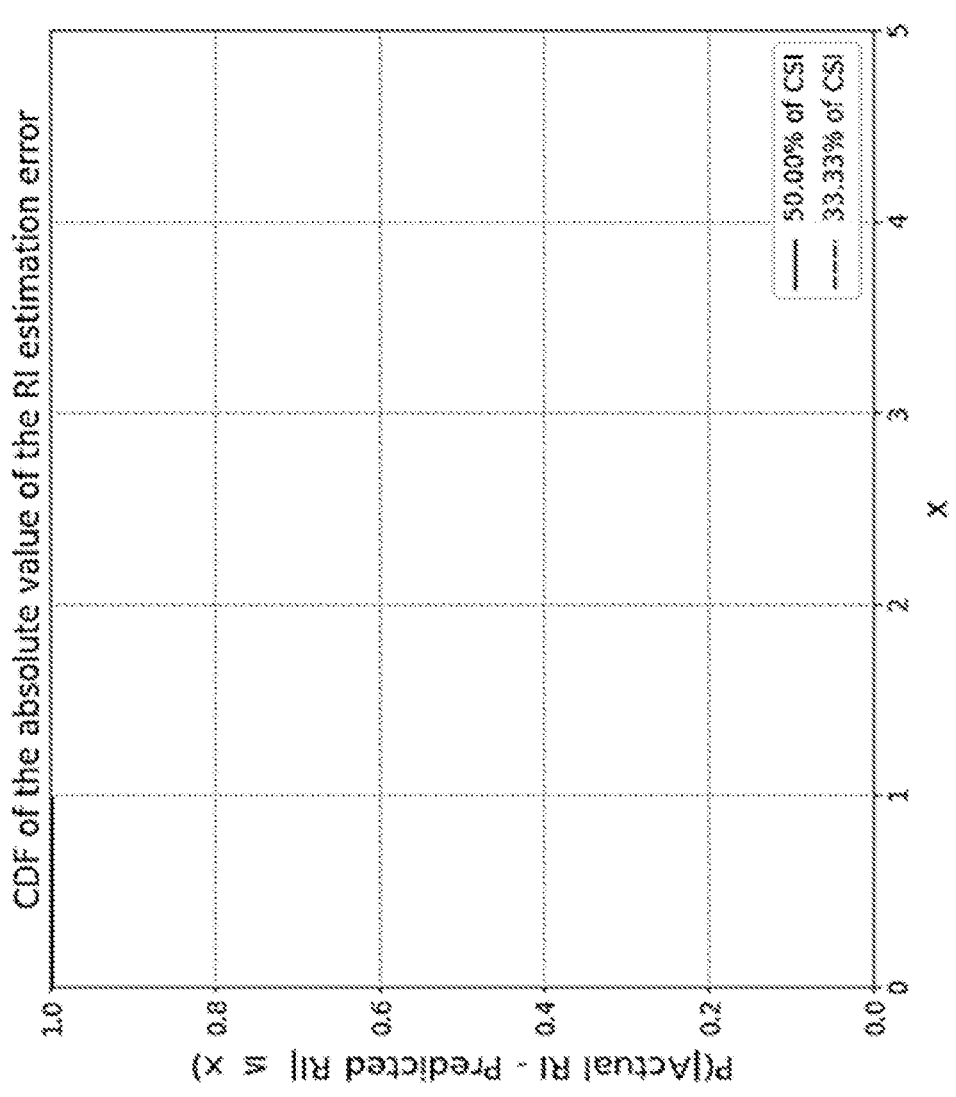
Figure 8C:
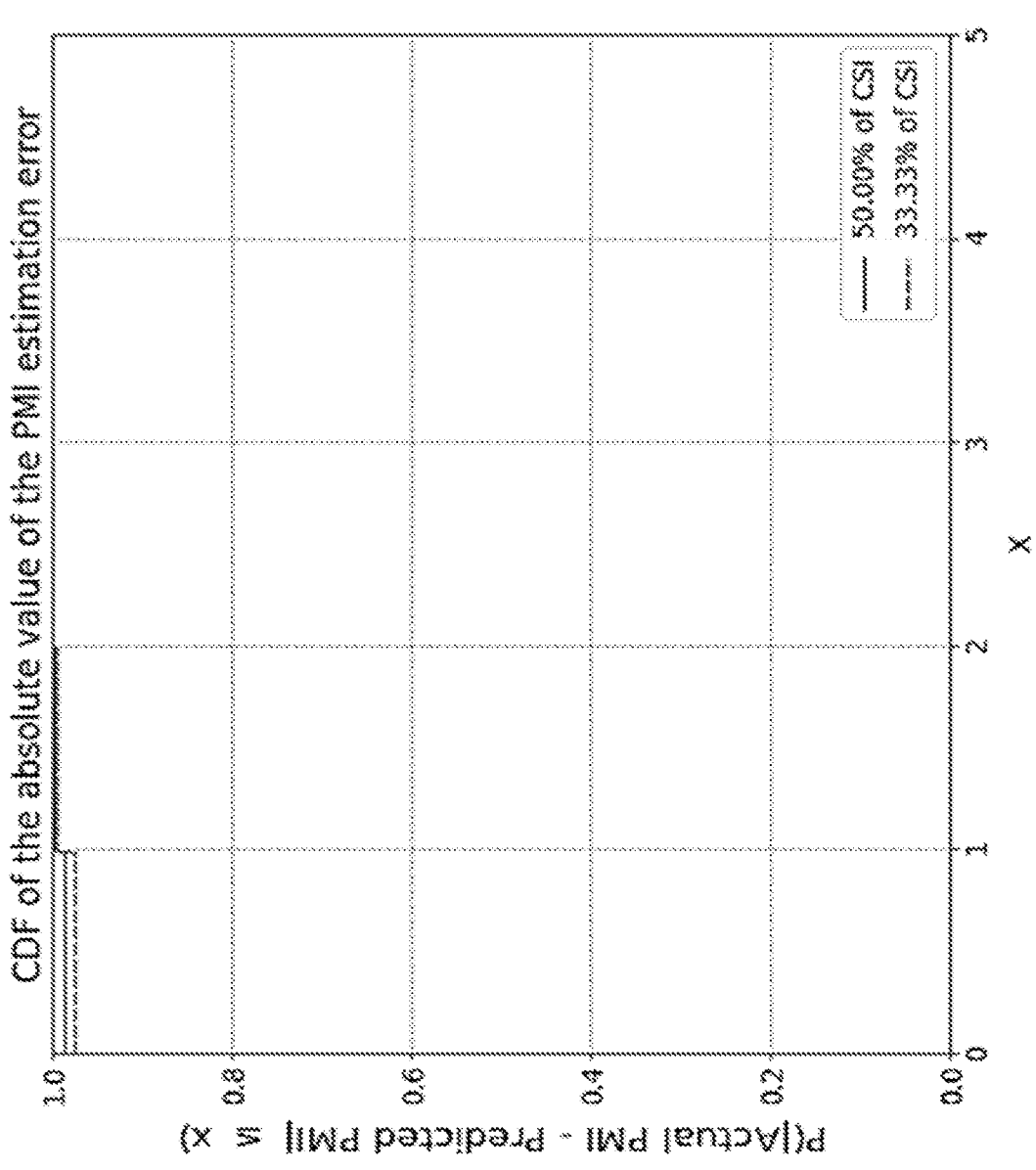

FIGS. 8A to 8C shows performance of the predictions performed for predicted SCC CQI values.

Simulation have been performed using real data obtained from trials. The overall dataset consists of 50130 CSI reports in a multi-carrier component system with 4 cells. The CSI reports contain several channel state indicators: the CQI, RI (rank indicator), PMI (pre-coding matrix indicator), and the MCS (Modulation and coding scheme) values for both the PCC and one or two of the activated SCCs. A training dataset consisting of 30000 samples has been used. CQI values sequences of length k=6 have been used to train the model. The two cases were simulated:
 Case A: 50% of the SCC CQI reports were dropped (curves in plain line).
 Case B: 66.67% of the SCC CQI reports were dropped (curves in dotted line).

The LSTM architecture described by reference to FIGS. 4 to 7 was used. The inputs were converted to one-hot encoded vectors and fed to the FCN as a single vector, i.e., the pair (PCQI,X) was concatenated to form a single vector after one-hot encoding. The activation function for the LSTM was a linear function, and the output was quantized to the nearest integer. The training loss used was MAE, and this was used for the output and target pair before quantization. The same process was repeated for the prediction of PMI and RI, using separate models for each of the channel state indicators.

FIGS. 8A to 8C shows the Cumulative Density Function (CDF) of the absolute value of the estimation errors for the prediction performed respectively for the CQI, PMI, and RI for different percentages ($\frac{1}{2}=50\%$ and $\frac{2}{3}=66.67\%$) of reduction in SCC CSI reporting frequency. Due to the quantization of the output CQI values, the errors are integral values. The CDFs show that the RI prediction is 100% accurate on the test data, while the CQI and RI prediction errors are within ±1 from their respective true values. These results show that a reduction of the frequency of the CSI reports by a factor of $\frac{2}{3}$ do not affect the system performance. Also, 97% of the prediction error (difference between the report SCC CQI value and the predicted SCC CQI value) is less than or equal to 1 when 50% of the SCC CQI reports are dropped.

Figure 9:
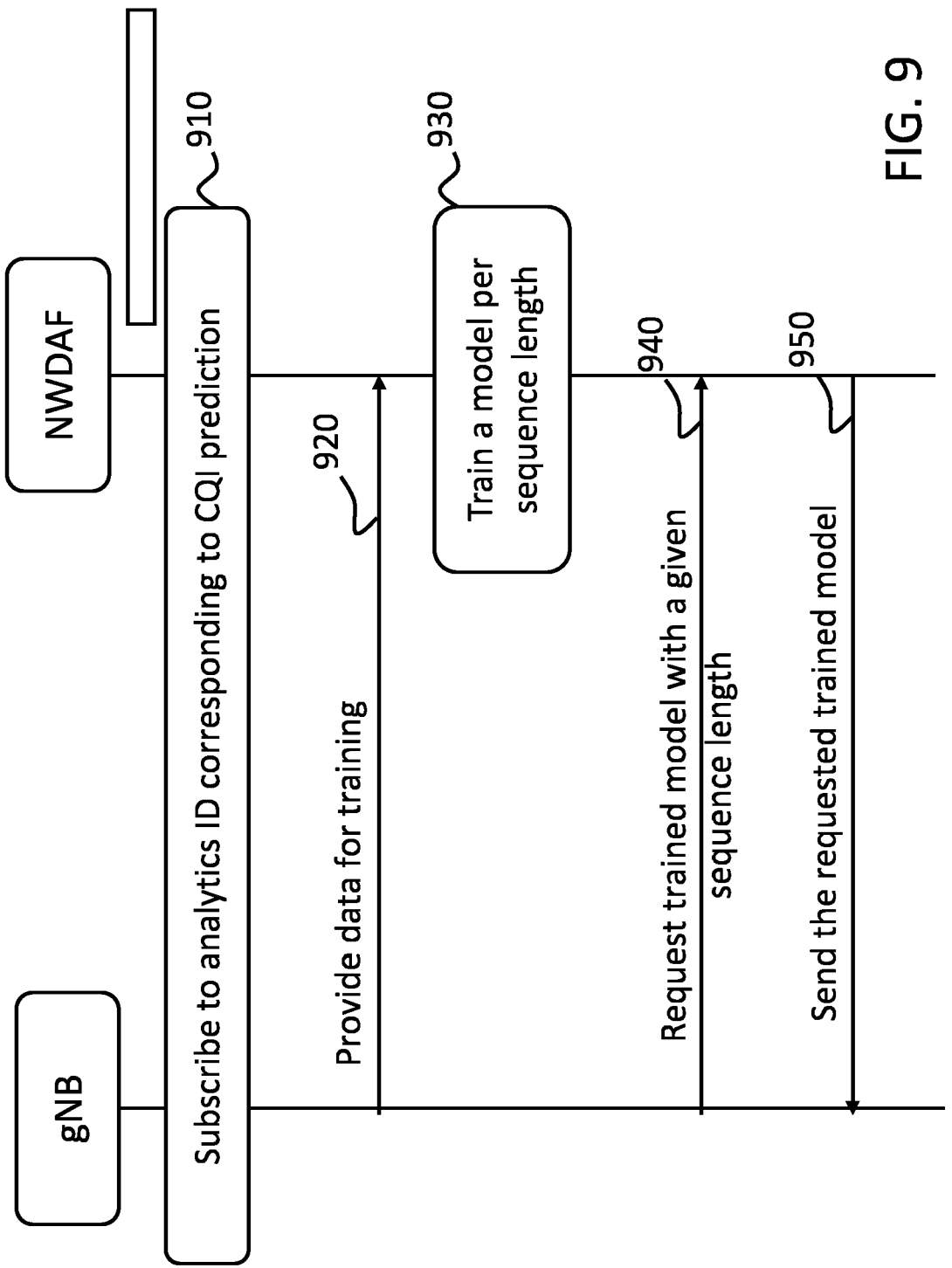
FIG. 9 shows a flow diagram for network integration of a prediction model.

FIG. 9 shows a flow diagram for network integration of a prediction model.

In order to enable SCC CQI prediction using ML-based model, the base station may subscribe (step 910) a new data analytics function corresponding to CQI prediction function at a NWADF (Network Data Analytics Function).

The base station provides (step 920) the necessary training data (Reported channel indicator values for PCC and SCC) to perform the training. These training data include a set of SCC and PCC CQI received reports and may include the desired sequence lengths (to enable model training tailored for each sequence length, where a sequence length is the number of time slots (or the number of PCC CQI reported values) that are taken into account for the prediction. As explained above, this sequence length may correspond to a reporting period $mT_{PCC}$.

The ML-based model used for SCC CQI prediction may be hosted and trained (step 930) at the NWDAF. The NWDAF is part of the architecture specified in 3GPP Technical Specification TS 23.501 and uses the mechanisms and interfaces specified for 5GC in 3GPP Technical Specification 23.501 and OAM services (see clause 6.2.3.1).

Within NWDAF, a Model Training logical function (MTLF) may be used. The MTLF is a logical function which trains Machine Learning (ML) models and exposes new training services (e.g. providing trained ML model) as defined for example in clause 7.5 and clause 7.6. in 3GPP Technical Specification TS 23.288.

The MTLF may receive as input the historical data (including the reported PCC and SCC CQI values reported during a sliding prediction window) and the SCC reporting period, the SCC reporting period defining the size of the sliding prediction window. The MTLF may for example generate a trained model per SCC reporting period.

Upon the accomplishment of the training phase for the different values of sequence length or the SCC reporting period $mT_{PCC}$ (e.g. for the different values of the ratio m), the NWDAF will then host a pool of different trained models: a model dedicated for each SCC reporting period $mT_{PCC}$/each ratio m/each sequence length. Thus, each time, the base station updates the SCC reporting period $mT_{PCC}$/ each ratio m/each sequence length, the base station may request (step 940) the appropriate ML model to NWDAF, which in return, will send the requested trained model (step 950). This allows a distribution of prediction models per request.

It should be appreciated by those skilled in the art that any functions, engines, block diagrams, flow diagrams, state transition diagrams, flowchart and/or data structures described herein represent conceptual views of illustrative circuitry embodying the principles of the invention. Similarly, it will be appreciated that any flow charts, flow diagrams, state transition diagrams, pseudo code, and the like represent various processes.

Although a flow chart may describe operations as a sequential process, many of the operations may be performed in parallel, concurrently or simultaneously. Also some operations may be omitted, combined or performed in different order. A process may be terminated when its operations are completed but may also have additional steps not disclosed in the figure or description. A process may correspond to a method, function, procedure, subroutine, subprogram, etc. When a process corresponds to a function, its termination may correspond to a return of the function to the calling function or the main function.

Each described function, engine, block, step described herein can be implemented in hardware, software, firmware, middleware, microcode, or any suitable combination thereof.

When implemented in software, firmware, middleware or microcode, instructions to perform the necessary tasks may be stored in a computer readable medium that may be or not included in a host apparatus or host system. The instructions may be transmitted over the computer-readable medium and be loaded onto the host apparatus or host system. The instructions are configured to cause the host apparatus or host system to perform one or more functions disclosed herein. For example, as mentioned above, according to one or more examples, at least one memory may include or store instructions, the at least one memory and the instructions may be configured to, with at least one processor, cause the host apparatus or host system to perform the one or more functions. Additionally, the processor, memory and instructions, serve as means for providing or causing performance by the host apparatus or host system of one or more functions disclosed herein.

The host apparatus or host system may be a general-purpose computer and/or computing system, a special purpose computer and/or computing system, a programmable processing apparatus and/or system, a machine, etc. The host apparatus or host system may be or include or be part of: a user equipment, client device, mobile phone, laptop, computer, network element, data server, network resource controller, network apparatus, router, gateway, network node, computer, cloud-based server, web server, application server, proxy server, etc.

Figure 10:
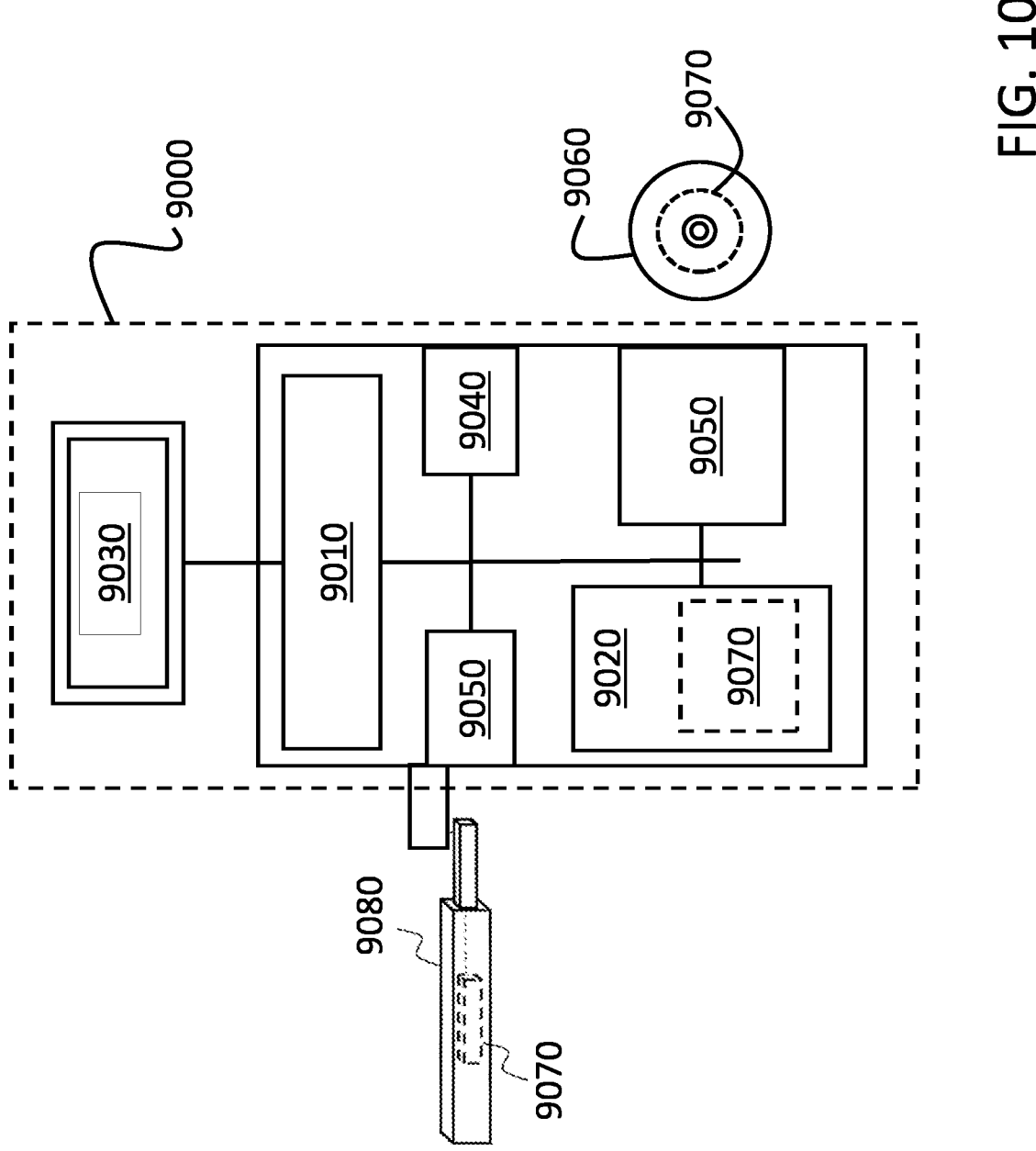
FIG. 10 is a block diagram illustrating an exemplary hardware architecture of an apparatus according to an example.

FIG. 10 illustrates an example embodiment of an apparatus 9000. The apparatus 9000 may be or be part of a base station or NWDAF as disclosed herein. The apparatus is configured to perform methods and/or functions defined herein for the base station or the NWDAF.

The apparatus 9000 may include at least one processor 9010 and at least one memory 9020. The apparatus 9000 may include one or more communication interfaces 9040 (e.g. network interfaces for access to a wired/wireless network, including Ethernet interface, WIFI interface, etc) connected to the processor and configured to communicate via wired/non wired communication link(s). The apparatus 9000 may include user interfaces 9030 (e.g. keyboard, mouse, display screen, etc) connected with the processor. The apparatus 9000 may further include one or more media drives 9050 for reading a computer-readable storage medium (e.g. digital storage disc 9060 (CD-ROM, DVD, Blue Ray, etc), USB key 9080, etc). The processor 9010 is connected to each of the other components 9020, 9030, 9040, 9050 in order to control operation thereof.

The memory 9020 may include a random access memory (RAM), cache memory, non-volatile memory, backup memory (e.g., programmable or flash memories), read-only memory (ROM), a hard disk drive (HDD), a solid state drive (SSD) or any combination thereof. The ROM of the memory 9020 may be configured to store, amongst other things, an operating system of the apparatus 9000 and/or one or more computer program code of one or more software applications. The RAM of the memory 9020 may be used by the processor 9010 for the temporary storage of data.

The processor 9010 may be configured to store, read, load, execute and/or otherwise process instructions 9070 stored in a computer-readable storage medium 9060, 9080 and/or in the memory 9020 such that, when the instructions are executed by the processor, causes the apparatus 9000 to perform one or more or all steps of a method described herein for the concerned apparatus 9000.

The instructions may correspond to program instructions or computer program code. The instructions may include one or more code segments. A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

When provided by a processor, the functions may be provided by a single dedicated processor, by a single shared processor, or by a plurality of individual processors, some of which may be shared. The term "processor" should not be construed to refer exclusively to hardware capable of executing software and may implicitly include one or more processing circuits, whether programmable or not. A processor or likewise a processing circuit may correspond to a digital signal processor (DSP), a network processor, an application specific integrated circuit (ASIC), a field programmable gate array (FPGA), a System-on-Chips (SoC), a Central Processing Unit (CPU), an arithmetic logic unit (ALU), a programmable logic unit (PLU), a processing core, a programmable logic, a microprocessor, a controller, a microcontroller, a microcomputer, a quantum processor, any device capable of responding to and/or executing instructions in a defined manner and/or according to a defined logic. Other hardware, conventional or custom, may also be included. A processor or processing circuit may be configured to execute instructions adapted for causing the host apparatus or host system to perform one or more functions disclosed herein for the host apparatus or host system.

A computer readable medium or computer readable storage medium may be any tangible storage medium suitable for storing instructions readable by a computer or a processor. A computer readable medium may be more generally any storage medium capable of storing and/or containing and/or carrying instructions and/or data. The computer readable medium may be a non-transitory computer readable medium. The term "non-transitory", as used herein, is a limitation of the medium itself (i.e., tangible, not a signal) as opposed to a limitation on data storage persistency (e.g., RAM vs. ROM).

A computer-readable medium may be a portable or fixed storage medium. A computer readable medium may include one or more storage device like a permanent mass storage device, magnetic storage medium, optical storage medium, digital storage disc (CD-ROM, DVD, Blue Ray, etc), USB key or dongle or peripheral, a memory suitable for storing instructions readable by a computer or a processor.

A memory suitable for storing instructions readable by a computer or a processor may be for example: read only memory (ROM), a permanent mass storage device such as a disk drive, a hard disk drive (HDD), a solid state drive (SSD), a memory card, a core memory, a flash memory, or any combination thereof.

In the present description, the wording "means configured to perform one or more functions" or "means for performing one or more functions" may correspond to one or more functional blocks comprising circuitry that is adapted for performing or configured to perform the concerned function (s). The block may perform itself this function or may cooperate and/or communicate with other one or more blocks to perform this function. The "means" may correspond to or be implemented as "one or more modules", "one or more devices", "one or more units", etc. The means may include at least one processor and at least one memory including computer program code, wherein the at least one memory and the computer program code are configured to, with the at least one processor, cause an apparatus or system to perform the concerned function(s).

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, an integrated circuit for a network element or network node or any other computing device or network device.

The term circuitry may cover digital signal processor (DSP) hardware, network processor, application specific integrated circuit (ASIC), field programmable gate array (FPGA), etc. The circuitry may be or include, for example, hardware, programmable logic, a programmable processor that executes software or firmware, and/or any combination thereof (e.g. a processor, control unit/entity, controller) to execute instructions or software and control transmission and receptions of signals, and a memory to store data and/or instructions.

The circuitry may also make decisions or determinations, generate frames, packets or messages for transmission, decode received frames or messages for further processing, and other tasks or functions described herein. The circuitry may control transmission of signals or messages over a radio network, and may control the reception of signals or messages, etc., via one or more communication networks.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

LIST OF ABBREVIATIONS

BS Base Station
CA Carrier Aggregation
CC Component Carrier
CDF Cumulative Density Function
CQI Channel Quality Indicator
CSI Channel State Information
CU Centralized Unit
DL Downlink
DNN Deep Neural Network
DU Distributed Unit
FCN Fully Connected Network
gNB gNodeB (NR base station), Next Generation of Node B
LSTM Long Short-Term Memory
MAE Mean Absolute Error
PCC Primary Carrier Component
PMI Pre-coding Matrix Indicator
RI Rank Indicator
RRC Radio Resource Control
SCC Secondary Carrier Component
UE User Equipment
UL Uplink
The invention claimed is:

1. A method, comprising:
receiving from a user equipment, UE, supporting Carrier Aggregation, CA, Channel State Information, CSI, reports for a Primary Component Carrier, PCC, for one or more previous time slots and for a current time slot;
receiving, from the UE, CSI reports for a Secondary Component Carrier, SCC, wherein the CSI reports include at least one CSI report for a previous time slot, wherein each CSI report from the UE includes a value of at least one channel state indicator reported by the UE; and
predicting a value of the channel state indicator for the SCC for the current time slot, wherein the value is predicted on the basis of one or more values of the channel state indicator reported by the UE for the PCC for the one or more previous time slots and for the current time slot and at least one value of the channel state indicator reported by the UE for the SCC for the previous time slot.

2. The method of claim 1, comprising:
configuring the UE with a SCC CSI reporting frequency, wherein the CSI reports for the SCC are received at the configured CSI reporting frequency, and wherein the received CSI reports include a CSI report for a current time slot;
adjusting the SCC CSI reporting frequency based upon a comparison of the value of the channel state indicator reported for the SCC for the current time slot and the predicted value of the channel state indicator for the SCC for the current time slot; and
configuring the UE with the adjusted SCC CSI reporting frequency.

3. The method of claim 2, wherein adjusting the SCC CSI reporting frequency includes:
computing a difference between the value of the channel state indicator received for the SCC for the current time slot and the predicted value of the channel state indicator for the SCC for the current time slot;
increasing the SCC CSI reporting frequency when the difference in absolute value is above a first threshold; and
decreasing the SCC CSI reporting frequency or leaving the SCC CSI reporting frequency unamended when the difference in absolute value is below the first threshold.

4. The method of claim 3, wherein when the SCC CSI reporting frequency is increased, the current frequency is increased until the SCC CSI reporting frequency reaches a PCC CSI reporting frequency configured for reporting CSI for the PCC.

5. The method according to claim 2, wherein adjusting the SCC CSI reporting frequency includes:
adjusting an integer ratio between the PCC CSI reporting frequency configured for reporting CSI for the PCC and the SCC CSI reporting frequency; and
computing the SCC CSI reporting frequency based on the integer ratio and the PCC CSI reporting frequency.

6. The method of claim 5, wherein the integer ratio is adjusted between a minimum value and a maximum value.

7. The method according to claim 1, wherein the channel state indicator comprises one of a Channel Quality Channel state indicator, a Precoding Matrix Channel state indicator and a Rank Channel state indicator.

8. The method according to claim 1, wherein predicting the value of the channel state indicator is performed using a trained machine learning, ML, based prediction model.

9. The method according to claim 8, wherein the trained ML-based prediction model comprises a model trained for a given SCC.

10. The method according to claim 8, wherein the trained ML-based prediction model comprises a model trained per frequency band covering one or more SCCs.

11. The method according to claim 8, wherein the trained ML-based prediction model comprises a model trained for several SCCs.

12. The method according to claim 8, wherein the trained ML-based prediction model includes at least one recurrent neural network.

13. A non-transitory computer-readable medium comprising program instructions stored thereon for causing an apparatus to perform a method comprising:
receiving from a user equipment, UE, supporting Carrier Aggregation, CA, Channel State Information, CSI, reports for a Primary Component Carrier, PCC, for one or more previous time slots and for a current time slot;
receiving, from the UE, CSI reports for a Secondary Component Carrier, SCC, wherein the CSI reports include at least one CSI report for a previous time slot, wherein each CSI report from the UE includes a value of at least one channel state indicator reported by the UE;
predicting a value of the channel state indicator for the SCC for the current time slot, wherein the value is predicted based upon one or more values of the channel state indicator reported by the UE for the PCC for the one or more previous time slots and for the current time slot and at least one value of the channel state indicator reported by the UE for the SCC for the previous time slot.

14. An apparatus comprising:
at least one processor;
at least one memory storing instructions that, when executed by the at least one processor, cause the apparatus to perform:

receiving from a user equipment, UE, supporting Carrier Aggregation, CA, Channel State Information, CSI, reports for a Primary Component Carrier, PCC, for one or more previous time slots and for a current time slot;

receiving, from the UE, CSI reports for a Secondary Component Carrier, SCC, wherein the CSI reports include at least one CSI report for a previous time slot, wherein each CSI report from the UE includes a value of at least one channel state indicator reported by the UE;

predicting a value of the channel state indicator for the SCC for the current time slot, wherein the value is predicted based upon one or more values of the channel state indicator reported by the UE for the PCC for the one or more previous time slots and for the current time slot and at least one value of the channel state indicator reported by the UE for the SCC for the previous time slot.

* * * * *